United States Patent [19]

Quigley

[11] Patent Number: 5,671,611
[45] Date of Patent: Sep. 30, 1997

[54] COOLER CHEST WITH ICE-SURROUNDED FOOD COMPARTMENT

[76] Inventor: Gene Kirk Quigley, 406 Karney Ave. NE., Palm Bay, Fla. 32907

[21] Appl. No.: 665,494

[22] Filed: Jun. 10, 1996

[51] Int. Cl.⁶ ............................................. F25D 3/08
[52] U.S. Cl. ........................ 62/457.7; 62/389; 62/371
[58] Field of Search .......................... 62/457.1, 457.2, 62/457.7, 371, 372, 389

[56] References Cited

U.S. PATENT DOCUMENTS

| | | | |
|---|---|---|---|
| 2,559,121 | 7/1951 | Hertzberg | 62/457.7 |
| 3,395,550 | 8/1968 | Dungan | 62/457.7 |
| 3,591,194 | 7/1971 | Vega | 280/47.26 |
| 4,319,629 | 3/1982 | Hotta | 165/47 |
| 4,498,312 | 2/1985 | Schlosser | 62/457.7 |
| 5,329,787 | 7/1994 | Friday | 62/389 |
| 5,462,213 | 10/1995 | Watt | 224/155 |
| 5,568,735 | 10/1996 | Newkirk et al. | 62/457.7 |
| 5,570,588 | 11/1996 | Lowe | 62/457.7 |

Primary Examiner—William Doerrler

[57] ABSTRACT

This is a cooler with a relatively narrow coolant compartment immediately within the insulated side walls of the cooler. This coolant compartment surrounds the food and beverage compartment. Each compartment has its own means to drain liquid. Ice can easily be poured into the coolant compartment because of a means for forming a funnel-like effect, which funnel-like effect shall extend around its top. There are separate means to seal each compartment at its top against the surrounding ambient temperature, and also provide individual access to each compartment.

3 Claims, 2 Drawing Sheets

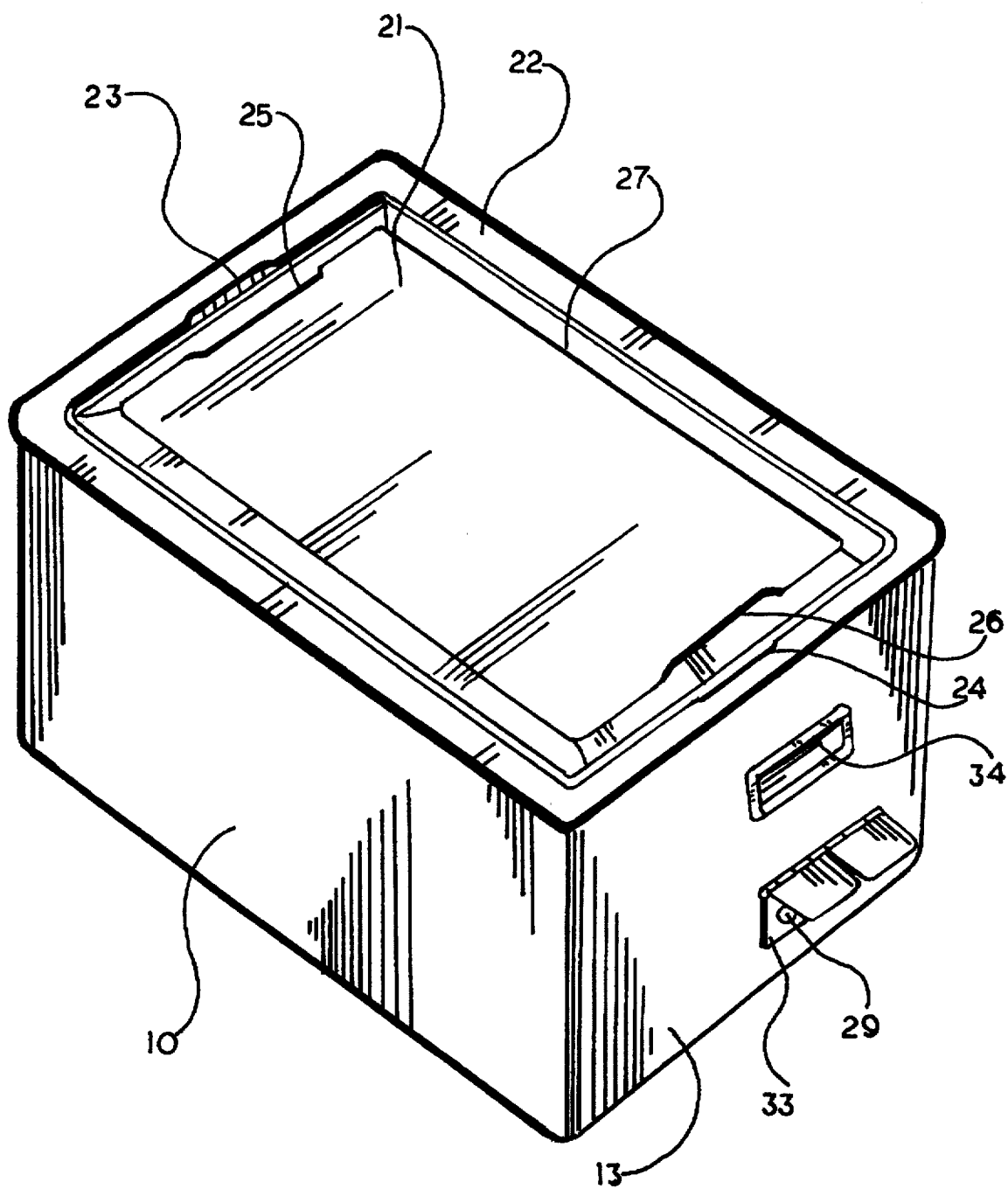
FIG_1

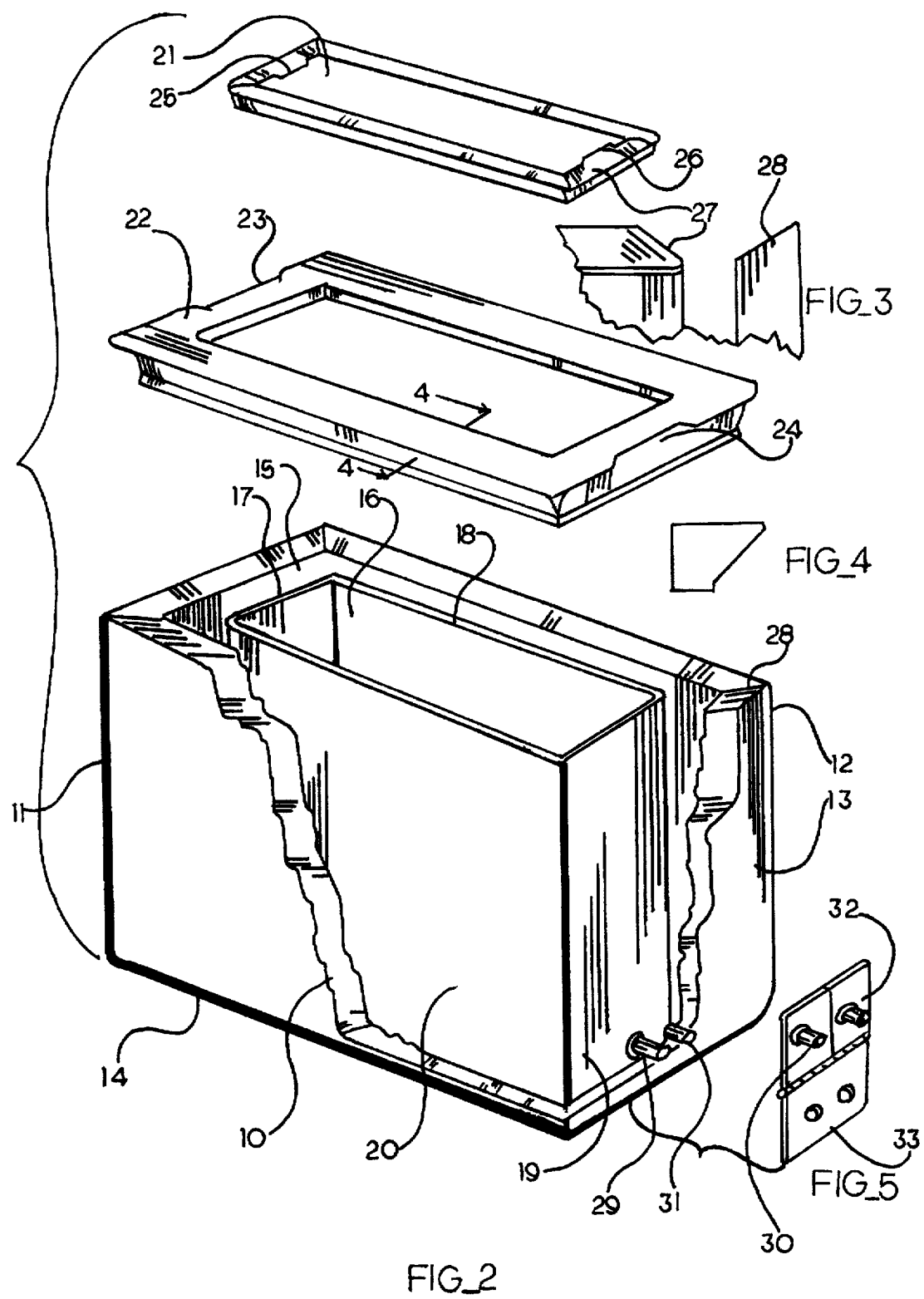

COOLER CHEST WITH ICE-SURROUNDED FOOD COMPARTMENT

BACKGROUND OF THE INVENTION

1. Field of the invention

This invention relates in general to cooler chests and in particular to an ice cooled chest where a coolant compartment surrounds the food and beverage compartment.

2. Prior Art

A problem with most cooler chests is that ice and food are usually stored in the same compartment. When the ice melts, it can contaminate the food, thus wasting much food. Also, this makes a mess to clean up. The food compartment must be opened when ice is put into the chest, thus allowing heat and moisture to enter to the ice and food compartment. Ideally, there should be a way to add ice without having it come into contact with the food, and add food without it becoming soggy with ice water. Further, there should be a convenient way of doing this, not having to remove anything but a lid. Also, ideally, ice should be able to be continually replenished while the food remains in the chest. The food compartment should not have to be opened when ice is added. The coolant compartment should not have to be opened when food is added. Each compartment should be drained separately so water from the ice does not find its way to the food stored in the main compartment and so any liquid in the main compartment can be easily disposed of. Also the water resulting from melted ice in most of the ice chests is not drinkable because of contamination by food or beverage containers.

Others have set out to solve some of these problems as the following examples show: U.S. Pat. No. 5,353,607 provides for a continuous drainage system for use with a commercially available insulated cooler. Also U.S. Pat. No. 5,295,369 separates the food compartment from the combined ice and beverage compartments. U.S. Pat. No. 5,329,787 utilizes a refreezable block with a food compartment and separate non contained beverage compartment.

These and other inventions have not completely solved the aforementioned problems. Some examples of inadequacies follow: In U.S. Pat. No. 5,353,607, a conventional cooler is used in which ice is put in with the food. To replenish the ice or the food, the common lid must be opened, thus exposing both ice and food to surrounding ambient temperature. Also, there is a very real possibility that the food could become contaminated with water from the melting ice. Also, the water will probably be contaminated by the containers stored in along with the ice.

In U.S. Pat. No. 5,295,369, a cooler with combined coolant and wet storage compartments on opposing sides of the separate food compartment, a common lid must be open to retrieve food from the food container, thus allowing the surrounding ambient temperature and moisture to infiltrate the coolant. Further, it is possible to contaminate the food in the main compartment by coolant dripping from the containers stored in the wet storage compartment as the beverage containers are removed from the coolant, or if the coolant overflows when the containers are placed in the coolant. Since this patent deals specifically with a compartment used for both coolant and beverage storage, the coolant will probably be contaminated as a result of storing beverage containers in with the coolant so it would not be fit for drinking. It has only one drain, this is for the coolant compartment, making it less convenient to rid the food compartment of liquid than if each had separate drains. Further, if ice is used as a coolant, it will not be evenly distributed unless the common lid is opened to place the ice into the chest.

U.S. Pat. No. 5,329,787 segregates food from the coolant, but it uses a coolant pack for cooling, which element must be removed after removing the main food compartment. The coolant cannot be replenished unless the food is exposed to outside temperature.

U.S. Pat. No. 4,286,440 again uses a coolant container where the common lid must be removed to remove the container. Again, surrounding ambient temperature can reach the stored food and beverages. The food stored underneath the container cannot be removed without removing the coolant container, thus exposing the coolant to ambient temperature.

Whatever the precise merits, features and advantages of the above cited references, none of them achieves or fulfills the purposes of the present invention.

SUMMARY OF THE INVENTION

It is a principal object of the present invention to completely segregate the food and beverage container from the coolant container in a cooler chest.

It is another object of the invention to provide a unit in which the food and beverage compartment will not have to be opened to add or remove coolant, nor will the coolant compartment have to be opened to add or remove food, beverages, or liquid from the food and beverage compartment.

It is another object of the invention to have a convenient means to pour ice into the coolant compartment so ice can be evenly distributed around the coolant compartment.

It is another object of the invention to design a cooler of this type in a manner so that the water from the coolant compartment will be drinkable, assuming that clean coolant is placed into the coolant compartment.

The elements comprising a preferred embodiment of this invention are as follows: An insulated chest. Immediately inside of the surrounding insulated walls of this chest is a narrow coolant compartment which surrounds an inner food and beverage storage compartment. The inner walls of the coolant compartment are made of thermally conductive material. These thermally conductive walls surround the inner compartment, which is used to store food and beverages. Each of these compartments is topped with an insulated lid. The inside floor of the insulated chest forms the floors of these compartments. Each compartment is sealed against leakage of liquids. The outer walls of the insulated chest form half of a funnel-like effect at their top. The other half of the funnel-like effect is provided by an angled portion of the surrounding part of the lid of the main storage compartment. The purpose of this funnel-like effect is to be able to facilitate the pouring of ice into the narrow surrounding coolant compartment for use as coolant for the cooler unit. Each compartment has a means to drain it so the water resulting from the melting ice in the coolant compartment does not infiltrate the inner storage container, thereby contaminating the water and wetting the food. Also, one may desire to drain the inner food and beverage compartment of liquid formed by condensation, or of liquid which may exist there for any other reason such as cleaning, spillage, etc.

In a preferred embodiment of this invention, each compartment has its own lid. Therefore it will not be necessary to remove the main lid over the inner compartment when it is necessary to add ice to the surrounding compartment, nor will it be necessary to remove the "ring-like" lid of the coolant compartment when removing from or adding to the contents of the inner container.

In a preferred embodiment of this invention, both the main lid and the "ring-like" outer lid will have the upper surfaces on the same plane for convenient stacking of these containers.

In another embodiment of this invention, a multi-piece lid may be used for the coolant compartment which has a means to form a funnel-like effect made up solely of the elements of the lid (not shown). Again, this would be used to facilitate the pouring of ice into the surrounding ice container.

In another embodiment of this invention, the funnel-like effect may be formed by the walls of the coolant compartment.

In another embodiment of this invention, the coolant container may not reach all the way to the bottom level of the inner compartment.

In another embodiment of this invention, the narrow surrounding coolant compartment may take the form of four connected narrow compartments which surround the central compartment.

BRIEF DESCRIPTION OF THE DRAWINGS

FIG. 1 is an illustration of a preferred embodiment of this invention as it might be seen from the outside.

FIG. 2 is an exploded cutaway view of a preferred embodiment of this invention.

FIG. 3 is a cross-section of the funnel-like effect made up of the elements of the coolant compartment top and angled surface of the outer part of the top of the food compartment lid.

FIG. 4 is a detail view of a cross-section of the coolant compartment lid.

FIG. 5 is a construction of the drain plugs for the two compartments.

DETAILED DESCRIPTION

FIG. 2, the exploded cutaway view of a preferred embodiment of the invention shows an insulated ice cooler with insulated side walls (10,11,12,13) and which has an insulated floor(14). Immediately within the insulated side walls of the cooler, there is a narrow coolant compartment (15), which compartment is sealed against leakage of liquids at its bottom and sides, and which coolant compartment surrounds a main central compartment (16) used for food and beverage storage, which main central compartment is also sealed against leakage of liquids at its bottom and sides. The narrow coolant compartment is one whose inner walls (17,18,19,20) are thermally conductive, and which walls surround the central compartment used for food and beverage storage.

It can be seen in this view of a preferred embodiment of the invention that this is a cooler which has a main central compartment whose side walls (17,18,19,20) are thermally conductive, because in this preferred embodiment of the invention, the side walls are the same walls as the inner walls of the narrow coolant compartment by which this main compartment is surrounded, which walls have been specified as being thermally conductive.

Also shown is the fact that each compartment is separately accessible from the outside of the cooler without having to access the other compartment, because each compartment has a means to seal its top against the ambient temperature surrounding the cooler, which means can allow access to its respective compartment individually, when the means is not being used to seal its respective compartment. In this embodiment of the invention, the means to seal the main central compartment is the inner lid (21), and the means to seal the coolant compartment is the outer ring-like lid (22).

Each lid has finger holds (23,24,25,26) built into it to assist in removing the lid from the cooler.

Also depicted is a cross section of the ring-like outer lid of the coolant compartment FIG.4, showing a construction which covers the top of the outer walls of the cooler as well as seals the coolant compartment, while not interfering with the removal of the inner main central compartment lid.

It can also be seen that there is a means to form a funnel-like effect, which funnel-like effect shall extend around the top of the coolant compartment when the inner lid of the main central compartment is in place, which funnel-like effect can be used to facilitate the pouring of ice into the coolant compartment. The cross section detail view FIG.3 shows that one half of the funnel-like effect is made up an angled portion (27) of the out side top edges of the inner lid, while the other half of the funnel-like effect is made up of an angled portion (28) of the tops of the surrounding insulated side walls of the cooler.

Depicted also is the fact that each compartment has its individually operable means to drain liquid to the outside of the cooler when one wishes to drain liquid, which means is designed so liquid from each compartment will not infiltrate the other compartment. This cooler can provide drinkable water from the coolant compartment in the form of water from melting ice, if clean ice was placed in the coolant compartment. Shown is the drain for the main central compartment (29), and its stopper (30), and the drain for the coolant compartment (31), and its stopper (32) each mounted on one half of a split hinge, the opposite section of which hinge (33) is attached to the outside of the cooler with a suitable bonding agent, which hinge has holes in it which line up with the drains, and made so the stoppers will line up with the drains when the half hinges on the other side are in a closed position.

FIG. 1 shows that this preferred embodiment of the invention has simple handholds (34) for lifting the cooler.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. An insulated ice cooler comprising:

a. A narrow coolant compartment immediately within the insulated side walls of the cooler, which compartment is sealed against leakage of liquids at its bottom and sides, and which coolant compartment surrounds a main central compartment used for food and beverage storage, which main central compartment is also sealed against leakage of liquids at its bottom and sides, a coolant compartment whose inner walls are thermally conductive, which walls surround the central compartment used for food and beverage storage, b. said cooler which has a main central compartment used for food and beverage storage whose side walls are thermally conductive, which main central compartment is surrounded by a narrow coolant compartment, c. said cooler in which each compartment is separately accessible from the outside of the cooler without having to access the other compartment, because each compartment has a means to seal its top against the ambient temperature surrounding the cooler, which means can allow access to its respective compartment individually, when the means is not being used to seal its respective compartment, d. said cooler which has an insulated floor.

2. a. The cooler as described in claim 1 which has a coolant compartment for which there is a means to form a funnel-like effect, which funnel-like effect shall extend around the top of the coolant compartment, which funnel-like effect can be used to facilitate the pouring of ice into the coolant compartment.

3. a. The cooler as described in claim 1 in which each compartment has its individually operable means to drain liquid to the outside of the cooler when one wishes to drain liquid, which means is designed so liquid from each compartment will not infiltrate the other compartment, b. said cooler which can provide drinkable liquid from the coolant compartment in the form of water from melting ice, if clean ice was placed into the coolant compartment.

* * * * *